US007062681B2

(12) United States Patent
Larsson et al.

(10) Patent No.: US 7,062,681 B2
(45) Date of Patent: Jun. 13, 2006

(54) METHOD AND SYSTEM FOR GENERICALLY REPORTING EVENTS OCCURRING WITHIN A COMPUTER SYSTEM

(75) Inventors: Jeffrey E. Larsson, Kirkland, WA (US); Kirk A. Glerum, Redmond, WA (US); Meredith A. McClurg, Woodinville, WA (US); Kevin J. Fischer, Sammamish, WA (US); Steven M. Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 10/308,538

(22) Filed: Dec. 3, 2002

(65) Prior Publication Data

US 2004/0107387 A1 Jun. 3, 2004

(51) Int. Cl.
*G06F 11/00* (2006.01)

(52) U.S. Cl. .......................................... 714/39; 714/38

(58) Field of Classification Search .................. 714/25, 714/39, 38

See application file for complete search history.

(56) References Cited

U.S. PATENT DOCUMENTS 5,740,354 A 4/1998 Ben-Natan et al. .... 395/183.21
5,790,779 A 8/1998 Ben-Natan et al. .... 395/183.15
6,145,096 A * 11/2000 Bereiter et al. ............... 714/25
6,182,243 B1 * 1/2001 Berthe et al. ................. 714/38
6,356,887 B1 3/2002 Berenson et al. .............. 707/2
2002/0078142 A1 6/2002 Moore et al. ............... 709/203
2003/0097617 A1 * 5/2003 Goeller et al. ................ 714/39

FOREIGN PATENT DOCUMENTS

EP 586767 A1 * 3/1994

OTHER PUBLICATIONS

Khosh-Khui, S.A., "Electronic Error Reporting Via Internet In The VAX Environment," *OCLC Systems & Services*, 1995, vol. 11, No. 1, p. 27-38.

Kerchner, D.J., Overlapping Development: The Continuous Maintenance Phase, Sessions Presented At Northcon/85 Conference Record, Oct. 1985, p. 5/1-1-6.

Yamada, S., Osaki, S., "A Reliability model On A Software Error Detecton Process," *Transactions of the Information Processing Society of Japan*, May 1983, vol. 24, No. 3, p. 376-378.

(Continued)

*Primary Examiner*—Bryce Bonzo
*Assistant Examiner*—Matthew Urick
(74) *Attorney, Agent, or Firm*—Merchant & Gould

(57) ABSTRACT

The invention provides a method and computer-readable medium for generically reporting the occurrence of an event occurring within a computer system. When an event occurs, parameter values corresponding to one or more predefined parameters that describe the event are identified. The parameter values are then stored in a normalized database configured for storing event parameters corresponding to the occurrence of an unlimited number of event types.

18 Claims, 8 Drawing Sheets

CLIENT COMPUTER
2
5
INFORMATION SERVER
INTERNET
8
ERROR REPORTING SERVER COMPUTER
10
4
LOCAL NETWORK
6
CORPORATE ERROR REPORTING FILE SERVER COMPUTER
9
DATABASE SERVER COMPUTER

OTHER PUBLICATIONS

Murthy, S., "How To Collect More Reliable Defect Reports," Nineteenth Annual Pacific Northwest Software Quality Conference, Oct. 2001, p. 279-293. Morin, R., "Distributed Quality Assurance," *UNIX Review*, Sep. 1993, vol. 11, No. 9, p. 107-108.

U.S. Appl. No. 09/559,123, entitled "Method and Apparatus for Displaying Computer Program Errors As Hypertext," filed Apr. 26, 2000; Inventor: William R. Softky.

U.S. Appl. No. 09/570,664, entitled "Method and System for Categorizing Failures of A Program Module," filed May 15, 2000; Inventors: Kirk A. Glerum, Matthew J. Ruhlen, Eric A. LeVine, Rob M. Mensching, Charles S. Walker.

U.S. Appl. No. 09/570,621, entitled "Method and System for Handling An Unexpected Exception Generated By An Application," filed May 15, 2000; Inventors: Matthew J. Ruhlen, Michael R. Maracelais, Brian T. Hill.

U.S. Appl. No. 09/570,825, entitled "System and Method for Handling A Failure Reporting Conversation," filed May 15, 2000; Inventors: Matthew J. Ruhlen, Kirk A. Glerum.

U.S. Appl. No. 09/571,629, entitled "Method and System for Reporting A Program Failure," filed May 15, 2000; Inventors: Kirk A. Glerum, Matthew J. Ruhlen, Eric A. LeVine, E. Peter Oosterhof.

U.S. Appl. No. 09/596,591, entitled "Method and System for Cyclic Crash Prevention During Application Startup," filed Jun. 19, 2000; Inventors: Michael R. Maracelais, Brian T. Hill, Eric A. LeVine, Steven Miles Greenberg.

U.S. Appl. No. 09/588,165, entitled "Method and System for Recovering Information During A Program Failure," filed Jun. 5, 2000; Inventors: Kevin Joseph Fischer, Eric A. LeVine, Brian T. Hill, Michael R. Marcaelais, Jeffrey Larsson.

U.S. Appl. No. 09/602,284, entitled "Method and System for Reporting Failures of a Program Module In a Corporate Environment," filed Jun. 23, 2000; Inventors: Kirk A. Glerum, Matthew J. Ruhlen.

U.S. Appl. No. 09/602,457, entitled "Method and System for Repairing Corrupt Files and Recovering Data," filed Jun. 23, 2000; Inventors: Kevin Fisher, Robert Coffen, Eric Snyder, Jeff Larsson.

* cited by examiner

METHOD AND SYSTEM FOR GENERICALLY REPORTING EVENTS OCCURRING WITHIN A COMPUTER SYSTEM

TECHNICAL FIELD

The present invention relates generally to the reporting of events occurring within a computer and, more specifically, to the reporting of different types of such events in a generic manner.

BACKGROUND OF THE INVENTION

One of the most important stages in the software development cycle is the debugging stage that occurs after a software product has shipped. This stage is important because the experiences of millions of users of the software product may be utilized during this stage to isolate program errors, identify frequently or infrequently used features, and to generally make the software product better. In order to capitalize on the body of user experience with the software product, however, it is necessary to obtain data from users and to route this data to the software developer.

Prior to the widespread adoption and use of the Internet, it was very difficult for software developers to obtain quality data regarding how a software product performs for a large number of users. Now, however, the Internet connects millions of users with the developers that create and debug the software they use. The Internet, therefore, allows data regarding the operation of a software product to be sent from a computer user to the developer of the product. The data may then be utilized by the developer to fix errors, also called "bugs," in the program, to change the way the program operates by adding or removing features, and to otherwise improve the program. However, current systems for transmitting this data from a user to a software developer suffers from several drawbacks that reduce their effectiveness.

Current systems for reporting data regarding the operation of a software product generate event reports in response to the occurrence of an event within program code. For instance, an event report may be generated when an error occurs in the program code, when an unhandled exception is generated by the program code, when a particular line of code is encountered, or under other circumstances. Data that may assist the developer in understanding the event and in modifying the program code to ensure that it does not occur again is typically included in the event report. For instance, data describing the state of the computer when the event occurred may be included along with other data in the event report.

Current systems for reporting data regarding the operation of a software product suffer from several serious drawbacks that limit their effectiveness. In particular, current reporting systems require that data describing any type of event be formatted in a manner compatible with a schema for describing program crashes, or require that a custom error type be defined for each type of event. Forcing all types of events to utilize a schema for program crashes is very limiting. For example, a software developer that needs more than the number of parameters utilized to describe crashes, or needs to utilize more data than allowed by the parameters, must somehow work around this limitation. Moreover, backend systems for mining the event data may not operate correctly on data for a non-crash event that is forced into a schema for describing program crashes. This makes it very difficult for a developer to filter the desired event data from the large body of program crash information.

Creating a custom error type for each event to be reported is also a less than desirable solution. Creating a custom error type for each event requires a substantial amount of work. In particular, this process includes creating custom software components for receiving the reports, defining and storing custom tables in a database, and creating custom Web pages and other components for viewing the data. Because of the complexity and amount of work required to create these tools, it is difficult to provide quality software components for viewing all types of events. As a result, the data generated in response to the occurrence of events is underutilized. Alternatively, because of the difficulty involved, a custom solution may not be created.

It is with respect to these considerations and others that the present invention has been made.

SUMMARY OF THE INVENTION

In accordance with the present invention, the above and other problems are solved by a method and apparatus for reporting the occurrence of an event that utilizes a generic reporting schema and database configured for transmitting and storing event data for any type of event. Moreover, the above and other problems are solved by a database for storing data relating to one or more events that is normalized and configured for storing data relating to any type of event.

In accordance with other aspects, the present invention relates to a method for reporting the occurrence of an event. According to the method, the occurrence of an event is detected and parameter values corresponding to one or more predefined parameters that describe the event are identified and then a report is sent. The parameter values are then stored in a normalized database configured for storing event parameters corresponding to the occurrence of many different types of events. The types of events that may be identified and stored in the database include unhandled exceptions, program crashes, asserts, setup failures, network connectivity issues, and other types of events occurring within a computer system.

In accordance with other aspects, the present invention relates to a method for generically reporting the occurrence of an unlimited number of types of events. According to this method, the occurrence of an event within a computer system, such as a program crash or unhandled exception, is detected. In response to the detection of the event, an event manifest or shared memory block is generated that contains data identifying an event name for the event and containing parameter values for one or more parameters corresponding to the event name. A network address is then constructed utilizing the event name and parameter values.

Once the network address has been constructed, an attempt is made to locate a data file stored at the network address. If a data file is located at the network address, the data file is retrieved. The contents of the data file are then utilized to identify a second network address, and to retrieve information regarding the occurrence of the event from the second network location. In this manner, data relating to the event, such as a help file or other information, may be conveniently retrieved based only on the event name and parameter values.

If a data file cannot be located at the second network address, the event name and parameter values may be transmitted to a remote database server application. The event name and parameter values may then be included in a normalized database configured for storing data for different event types. Additional data needed regarding the occurrence of the event may also be identified from an entry in the database. A request may then be transmitted to the client computer that generated the event report requesting the needed data. In response thereto, the client computer may transmit the needed data to the remote database server application. A second network address may also be provided to the client computer.

In accordance with still other aspects, the invention relates to a database for storing data related to one or more events. The database includes a first table for storing data that defines an event type for an event and data that identifies the number of parameters utilized to describe an occurrence of the event. The first table also identifies a default network address and identifies a default number of data files to collect. The database also includes a second table that is related to the first table that stores data uniquely identifying one or more occurrences of the event. The second table also stores data identifying the event type for each occurrence. The database also includes a third table related to the second table for storing parameter values for each occurrence of an event. The number of parameter values stored in the third table is equivalent to the number of parameters identified in the first table for the event type corresponding to the occurrence of the event. The database may also include a fourth table related to the first table that stores data identifying a name for each of the parameters associated with an event type.

The invention may be implemented as a computer process, a computing system, or as an article or manufacture, such as a computer program product, or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
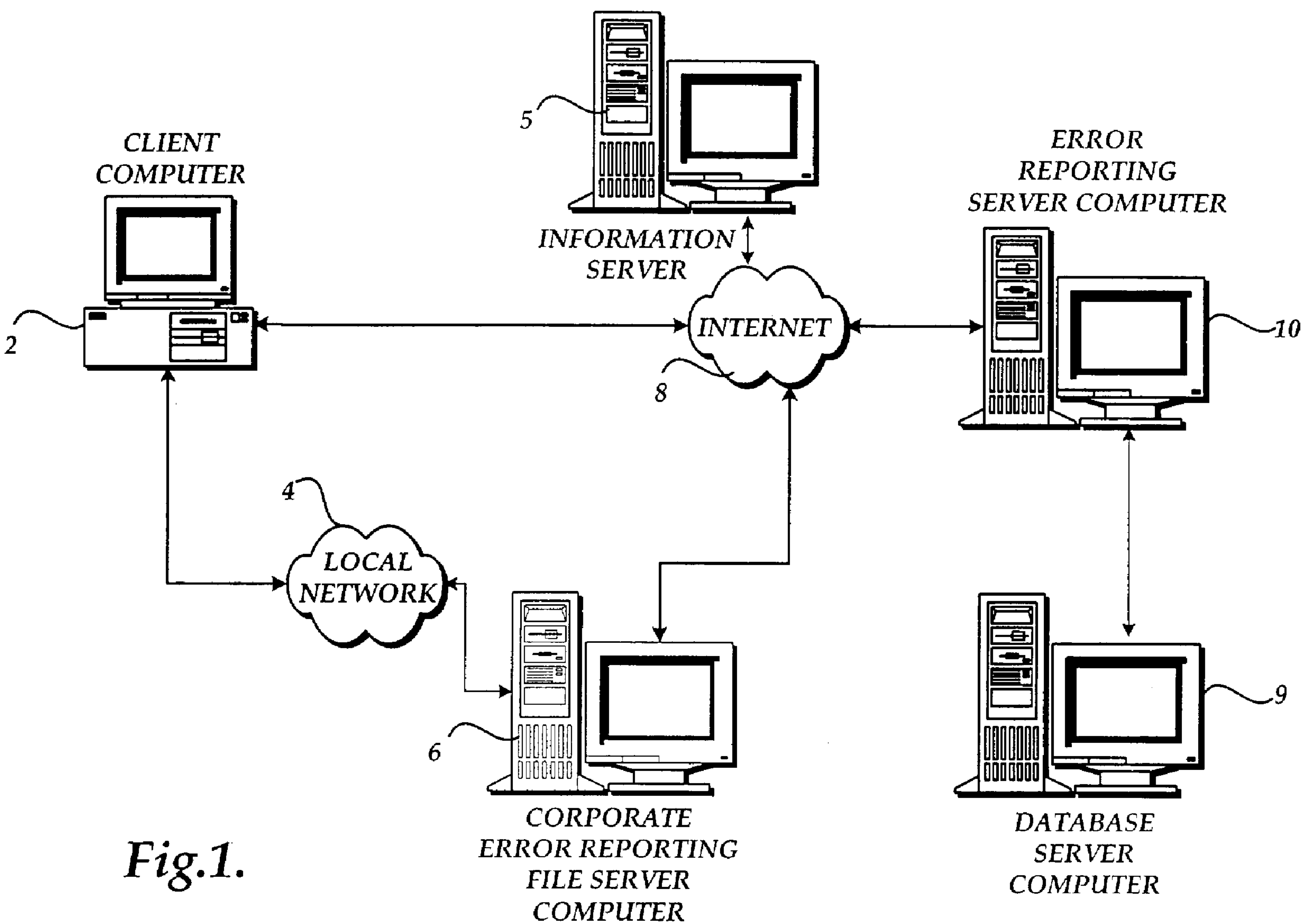
FIG. 1 is a network diagram illustrating a network configuration of computers utilized in one embodiment of the present invention.

Referring now to the drawings, in which like numerals represent like elements through the several figures, aspects of the present invention and the exemplary operating environment will be described. In particular, FIG. 1 shows an illustrative operating environment for various embodiments of the present invention. As shown in FIG. 1, a client computer 2 is utilized in the various embodiments of the invention. The client computer 2 comprises a standard desktop or server computer that may be used to execute one or more program modules. The client computer 2 is also equipped with program modules for generating error reports in response to events occurring within the client computer 2. Event reports may be generated in response to unhandled exceptions, software program errors, and other types of events.

As will be described in greater detailed below, the client computer 2 is also operative to transmit the error reports to a corporate error reporting ("CER") file server computer 6 available through a local area network ("LAN") 4. The CER file server computer 6 comprises a server computer maintained and accessible through the LAN 4 to the client computer 2. The CER file server computer receives error reports from the client computer 2, stores the reports, and may subsequently forward the error reports to the error reporting server computer 10. A policy may be set at the client computer 2 instructing the client computer 2 to transmit error reports to the CER file server computer 6.

A policy also may be set at the client computer 2 instructing the client computer 2 to transmit error reports through the Internet 8, or other type of distributed computing network, to the error reporting server computer 10. The error reporting server computer 10 comprises a server computer maintained typically by a developer of the software application or other type of program for receiving error reports. The error reports may assist the developer in correcting errors occurring within the client computer 2.

As will also be described in greater detail below, the client computer 2 is also operative to transmit event reports to the error reporting server computer 10 or the CER file server computer 6 in a generic manner. As will be described in greater detail below, a generic transmission format is utilized to transmit data regarding an unlimited number of event types. Additionally, the error reporting server computer 10 is operative to store the event reports in a normalized database that can be utilized also to store event data regarding any number of types of events. Alternatively, a database server computer 9 connected to the error reporting server computer 10 may be utilized to host the database.

According to one embodiment of the invention, an information server computer 5 is provided that allows the user of the client computer 2 to access helpful information regarding the occurrence of an event. In particular, according to one embodiment of the invention, the client computer 2 is operative to form a network address from various parameters describing an event. The network address may then be used by the client computer 2 to locate information contained on the server 10 pertaining to the error, if the data can be located at the server 10 using the network address, a data file is retrieved from the server 10. The client computer 2 then uses the data file to identify a second network address. For instance, the second network address may identify the location of Web site or other network resource hosted by the server 5 and containing helpful information regarding the error. The information may then be retrieved from the information server 5.

After the client computer 2 attempts to locate information regarding the occurrence of the event, the client computer 2 may generate an event report to the error reporting server computer 10. The event report is then stored by the error reporting server computer 10. Additionally, the error reporting server computer 10 is operative to identify additional data needed from the client computer 2 regarding the occurrence of the event. The error reporting server computer 10 then transmits an instruction to the client computer 2 for the needed data. The client computer 2 assembles the needed data and transmits the needed data to the error reporting server computer 10, where it is stored. It should be appreciated that the database server computer 9 may be utilized by the error reporting server computer 10 to store event reports and other data provided by the client computer 2 regarding the occurrence of the event. Additional details regarding the operation of the client computer 2, the error reporting server computer 10, and the other computing components shown in FIG. 1 will be described in greater detail below.

Figure 2:
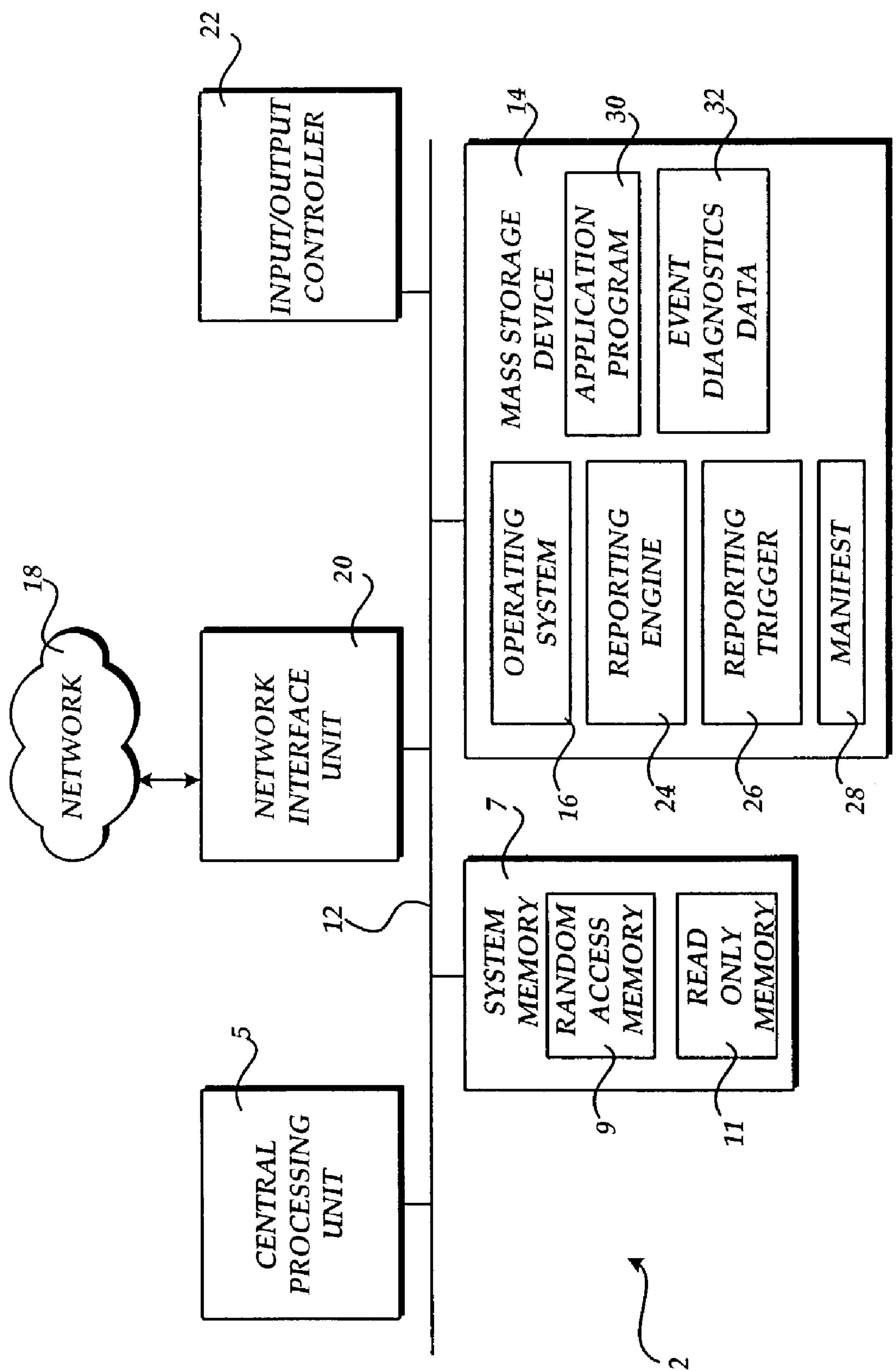
FIG. 2 is a computer architecture diagram showing various aspects of a client computer utilized in the various embodiments of the invention.

FIG. 2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 2, an illustrative computer architecture for a client computer 2 for practicing the various embodiments of the invention will be described. The computer architecture shown in FIG. 2 illustrates a conventional desktop or server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and program modules for reporting events occurring within the client computer 2.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a reporting engine program module 24. The reporting engine 24 contains functionality for generating error reports, queuing the error reports, and transmitting the error reports to either the CER file server 6 or the error reporting server computer 10. The reporting engine 24 may be utilized to perform these functions in response to an error or other type of event occurring within the operating system 16 or within an application program. Moreover, the reporting engine 24 may be utilized to perform these functions in response to other types of events such as the execution of a particular line of code on the CPU 5. Moreover, the reporting engine 25 may be explicitly called to perform some of its functions, such as dequeueing stored error reports.

The mass storage device 14 and RAM 9 may also include a reporting trigger program module 26. The reporting trigger 26 comprises a program module that is executed in response to certain types of events within the client computer 2. In response to these events, the reporting trigger 26 determines whether queued event reports should be dequeued. As used herein dequeueing refers to the process of transmitting one or more event reports from the client computer 2 to either the CER file server computer 6 or the error reporting server computer 10.

The mass storage device 14 and RAM 9 may also store a manifest 28. The manifest is a file generated by the application program 30 in response to the occurrence of an event. Once the manifest 28 has been created by the application program 30, it is passed to the reporting engine 24. The reporting engine 24 can then utilize the data contained in the manifest 28 to generate an event report to the en-or reporting server computer 10. It should be appreciated that a shared memory block may also be used to store and share the data contained in the manifest.

According to one embodiment of the invention, the manifest 28 contains an event type name for the event that has occurred and one or more parameters identifying various aspects of the event. The parameters identified in the manifest 28 may comprise any type of data structure and may be ordered in any order desired. Additionally, parameter names utilized to identify the parameters utilize generic names, such as P1, P2, etc., rather than hard coded parameter names. An illustrative manifest 28 is shown below in Table 1.

TABLE 1

| | |
|---|---|
| Eventtype = | crashdemo |
| P1 = | myexe |
| P2 = | 1.0 |
| P3 = | myd11 |
| P4 = | 2.0 |
| P5 = | 11111111 |

According to various embodiments of the invention, the mass storage device 14 may also store an application program 30. As described briefly above, the application program 30 is configured to identify various types of events and to call the reporting engine 24 in response to the occurrence of these events. For instance, the application program 30 may be configured to call the reporting engine 24 in response to the occurrence of an assert. As known to those skilled in the art, an assert comprises an instruction placed within the program code of the application program 30 that when executed, identifies a potential error condition. Asserts may be uniquely identified within the application program 30, or across one or more application programs, to uniquely identify the assert that has occurred. By transmitting data regarding the occurrence of the assert through the reporting engine 24 to the error reporting server computer 10, a developer of the application program 30 can troubleshoot and potentially correct problems within the application program 30. The mass storage device 14 may also store event diagnostics data 32. The event diagnostics data 32 may comprise data useful in the debugging of an event that has occurred within the computer 2. In particular, the event diagnostics data 32 may comprise a minidump, a minidump that has been sanitized to remove personally identifiable information (referred to herein as a "microdump"), a dump of the system memory 7, values for registers contained in the CPU 5, or other types of data regarding the various conditions present in the computer 2 when an event occurs. The event diagnostics 32 may be stored as a cabinet ("CAB") file or other type of compressed file.

Moreover, as will be described in greater detail below, the type of data contained in the event diagnostics data file 32 may be identified by the error reporting server computer 10 and requested from the client computer 2 in response to the receipt of an event report from the client computer 2. Additional details regarding this process will be described in greater detail below with respect to FIGS. 6A–6C.

Figure 3:
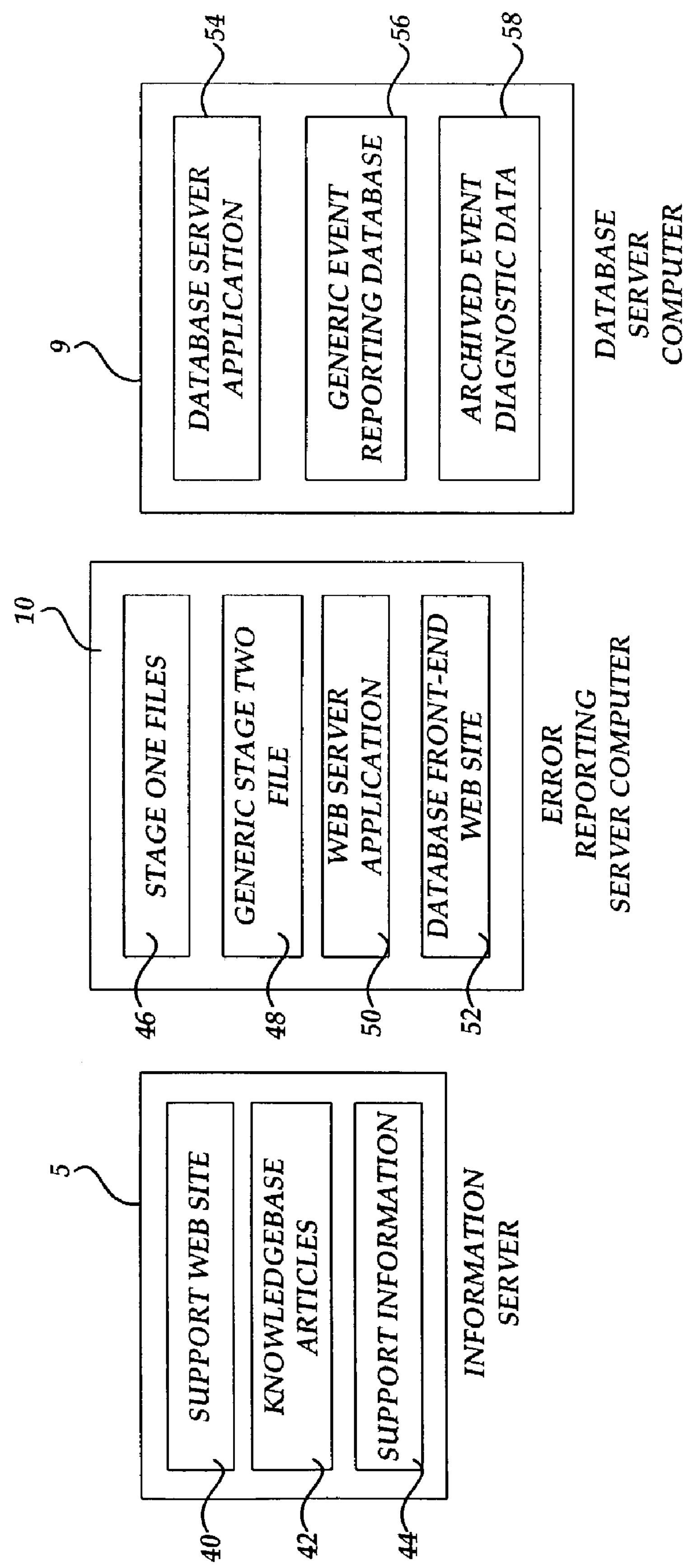
FIG. 3 is a computer software architecture diagram illustrating the various software components utilized by an information server, an error reporting server computer, and a database server computer in the various embodiments of the invention.

Referring now to FIG. 3, various software components utilized by the information server 5, the error reporting server computer 10, and the database server computer 9 will be described. In particular, the error reporting server computer 10 maintains one or more stage one files 46. The stage one files 46 comprise various files stored within a file structure corresponding to event names and event parameters. In particular, as will be described in greater detail below, the client computer 2 can generate a stage one network address based on the name of an event and the parameters corresponding to the event. For instance, the address may comprise the following URL: http://www.server.com/stageone/generic/shipassert/abcd/10_0_3704.htm. This network address is generated by the client computer 2 by concatenating the name of the event and each of the parameters utilized to describe the event. The network address may then be utilized by the client computer 2 to locate a file contained on the error reporting server computer 10 pertaining to the event.

In order to provide this functionality, the stage one files 46 are organized in directory structures corresponding to the event name and event parameters for each type of event. Moreover, the actual stage one files 46 comprise text files identifying the name of the event and a second network address that may be utilized by the client computer 2 to obtain further information regarding the event. For instance, in the stage one network address described above, the file entitled "10_0_3704.htm" may include the name of the event and a link to a support Web site 40, knowledgebase articles 42, or other support information 44 contained on the information server 5. By utilizing such a network address and the stage one files 46, the client computer 2 may quickly determine whether helpful data exists regarding the occurrence of the event prior to generating an event report.

The error reporting server computer 10 also maintains a generic stage two file 48. As will be described in greater detail below, the generic stage two file 48 comprises a server-side executable file for receiving event reports and storing event reports in the generic event report database 56. According to one embodiment of the invention, the generic stage two file 48 comprises an active server page ("ASP"), that may be called by the client computer 2 transmitting the event report. In order to call the generic stage two file 48 according to this embodiment, the client computer 2 may construct a stage two uniform resource locator ("URL") and perform an HTTP put to the generic stage two file 48. An example of such a network address is http://www.server.com/genericstagetwo.asp?eventtype=shipassert&p1=abcd&p2=10.0.3704. A similar structure may also be utilized to transmit event reports to the CER file server computer 6.

In order to host the stage one files 46 and the generic stage two file 48, the error reporting server computer 10 may also comprise a Web server application 50. As known to those skilled in the art, a Web server application 50 comprises a executable program for receiving and responding to requests for content stored at the error reporting server computer 10. The Web server application 50 may also provide access to a database front end Web site 52. The database front end Web site 52 provides convenient access to the contents of the generic event reporting database 56. The database front end Web site 52 may also provide access to archived event diagnostic data 58. In this manner, a developer of the application program 30 may obtain easy access to event data generated by the client computer 2 through the database front end Web site 52.

The generic stage two file 48 and the database front end Web site 52 may also communicate with the database server computer 9. In particular, a database server application 54 may be utilized to read from and write to the generic event reporting database 56. Moreover, the database server application 54 may be utilized to store archived event diagnostic data 58. As described above, the error reporting server computer 10 may request additional diagnostics data 32 from the client computer 2 in response to the receipt of an event report. If the client computer 2 responds with event diagnostics data 32, this data may be stored by the database server application 54 as archived event diagnostic data 58. The database front end Web site 52 may then be utilized to access this information. Additional details regarding the format and use of the generic reporting database 56 will be provided in greater detail below with respect to FIGS. 4–5.

Figure 4:
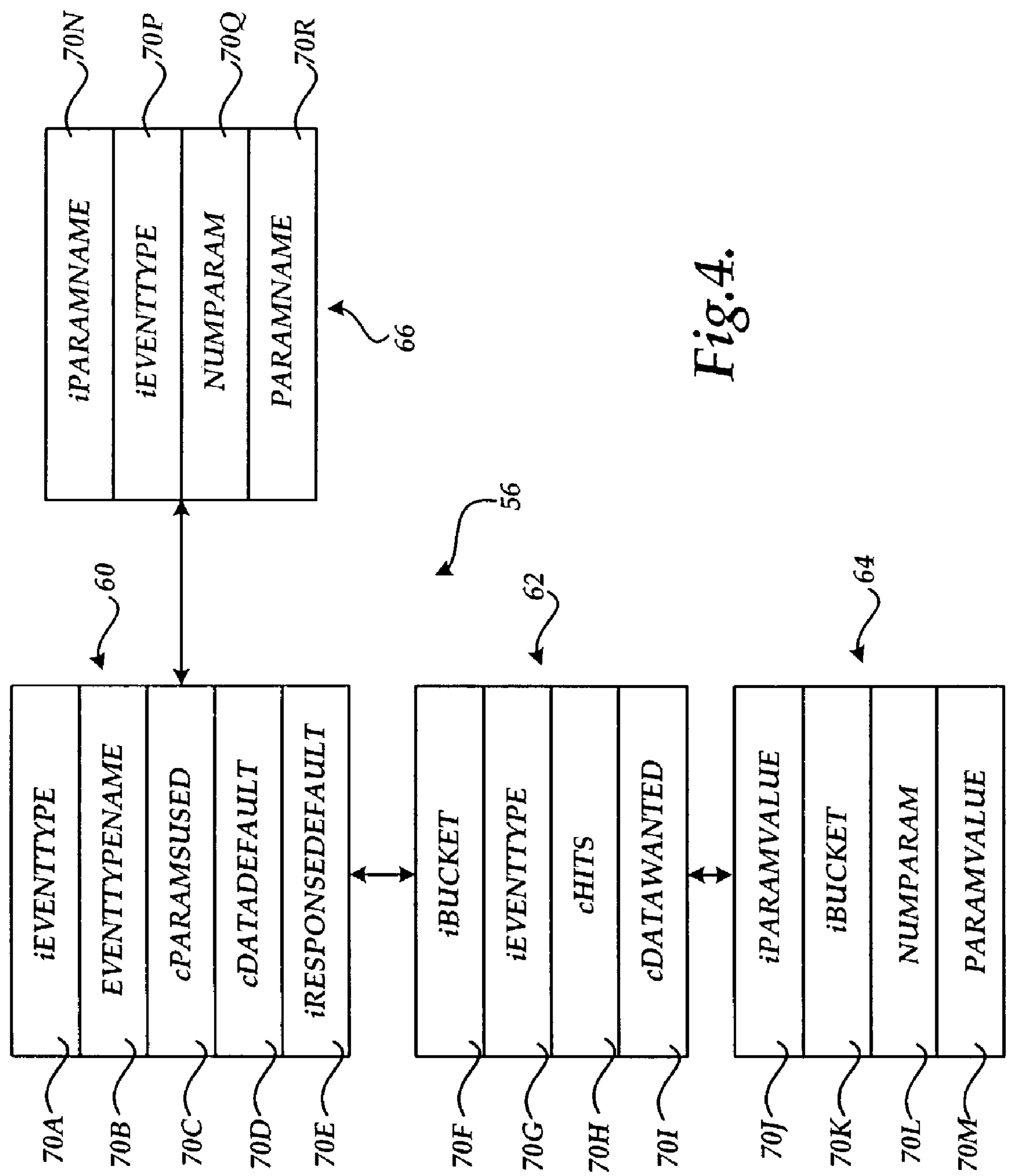
FIG. 4 is a database diagram showing an illustrative configuration of a generic event reporting database utilized in the various embodiments of the invention.

Referring now to FIG. 4, additional details regarding the structure of the generic event reporting database 56 will be described. As described briefly above, the event reporting database 56 is configured for storing event parameters corresponding to a virtually unlimited number of types of events. In particular, the database 56 comprises a relational database normalized for storing data pertaining to many different types of events. Accordingly, the database 56 includes a table 60 that defines various event types and the number of parameters utilized to describe an occurrence of the event. In order to store this type of data, an event type field 70A is utilized that stores a unique number corresponding to a particular type of event. For each unique event type, an event type name field 70B is utilized to provide a human readable name for the event. Additionally, for each unique event type stored in the event type field 70A, a parameters used field 70C is provided that identifies the number of parameters needed to describe an occurrence of the event type. The data default field 70D identifies the number of data files that should be collected for a particular occurrence of an event.

The response default field 70E contains data identifying a network address. As described above, the network address may be that of a help file, knowledgebase article, or other type of help content and is provided to a client computer when a request for information is made. The default network address may be changed for each unique event.

According to various embodiments of the invention, the database 56 also includes a bucket table 62. The bucket table 62 is related to the event type table 60 and stores data that uniquely identifies one or more occurrences of an event. In particular, the bucket table 62 includes a bucket field 70F that uniquely identifies an instance of an event. For each unique entry in the bucket field 70F, an entry is made in an event type field 70G corresponding to an event type defined in field 70A of the event type table 60. In this manner, a unique instance of an event may be identified within the database 56 and an event type defined for that instance. Moreover, a hits field 70H is provided that identifies the number of occurrences in the database 56 for each event type and unique parameter values corresponding to an occurrence of the event. In this manner, duplicative entries need not be contained in the database 56. Rather, if an entry is to be made in the database 56 identical to another preexisting entry, the hits field 70H is incremented for the existing entry. The bucket table 62 also includes a data wanted field 701 that identifies how much additional data should be requested from the client computer 2 when an event report is generated.

According to another embodiment of the invention, a parameter value table 64 is also provided as a part of the database 56. The parameter value table 64 is related to the bucket table 62. The parameter table 64 includes fields for storing parameter values for each occurrence of the event. The number of parameter values contained in the parameter value table 64 for each occurrence of an event is equivalent to the number of parameters identified in the parameters used field 70C for the event type corresponding to the unique occurrence of the event.

In particular, the parameter value table 64 stores a bucket field 76 that uniquely identifies a bucket within the bucket table 62. Additionally, the parameters value table 64 includes a parameter number field 70L and a parameter value field 70M. The parameter number field 70L identifies the parameter number for a particular value and the parameter value field 70M identifies the actual value itself. By creating multiple entries in the parameter value table 64 for each parameter within a bucket, the parameter value 70M for all of the parameters corresponding to an event type may be stored.

The database 56 also includes a parameter name table 66 in one embodiment of the invention. The parameter name table stores data identifying a name for each of the parameters associated with each event type. This facilitates referring to a parameter by its actual name rather than a parameter number. In particular, the parameter name table 66 includes an event type field 70P identifying a particular event type, a parameter number 70Q identifying a particular parameter, and a parameter name field 70R, identifying a name corresponding to the parameter number for the event type. The parameter name table 66 is related to the event type table 60.

Figure 5:
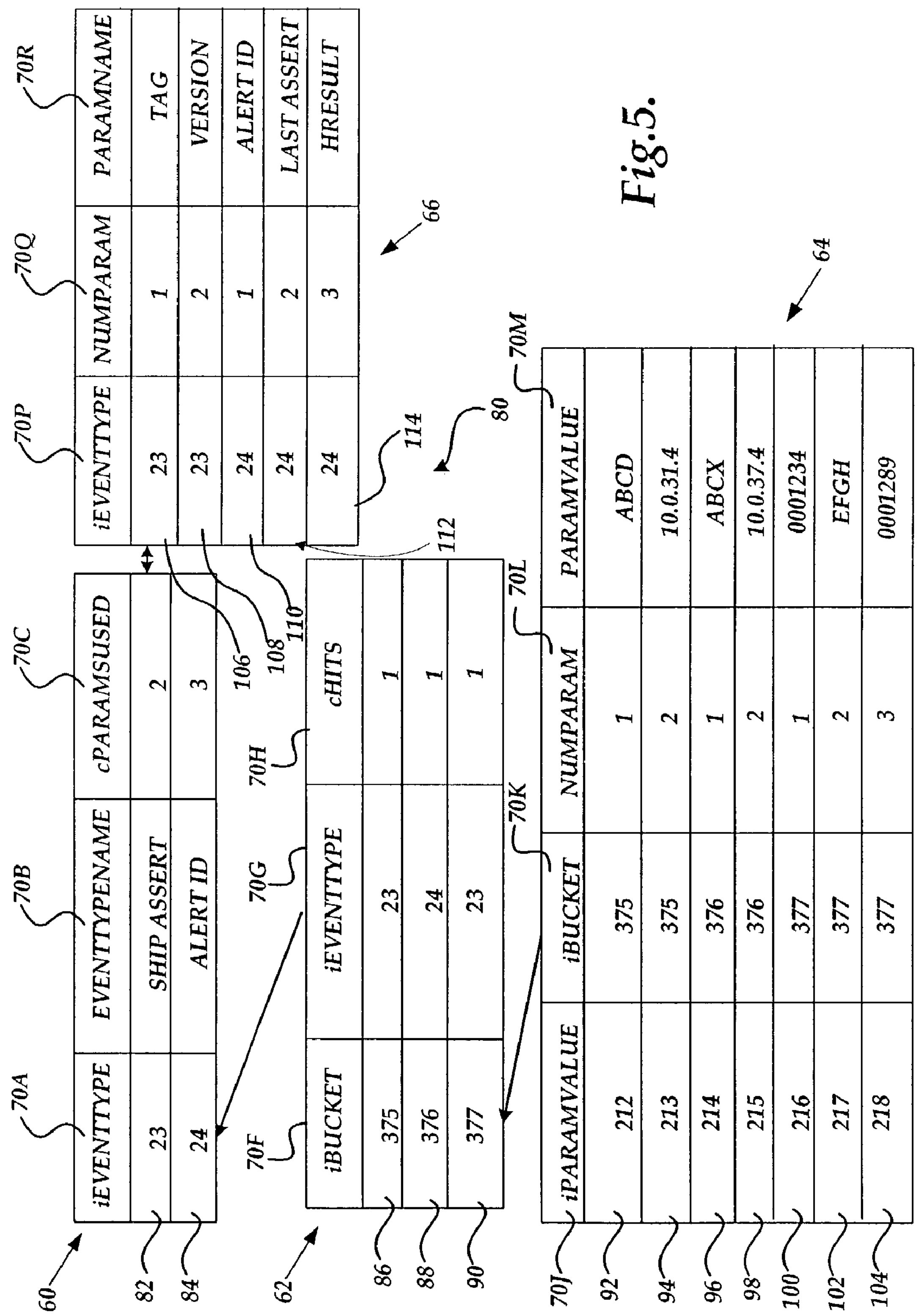
FIG. 5 is a database diagram showing an illustrative example of the contents of a generic event reporting database utilized by the various embodiments of the invention.

Turning now to FIG. 5, the contents 80 of an illustrative database 56 will be described. As shown in FIG. 5, the event type table 60 includes an entry 82 corresponding to an event type named "ship assert" corresponding to an event type of 23. Entry 82 further identifies that the event named "ship assert" utilizes two parameters. Similarly, the entry 84 in the event type table 60 defines an event named "alert" within an event type of 24 that utilizes three parameters.

The bucket table 62 shown in FIG. 5 indicates that three events have been stored in the database. The events are identified by bucket numbers 375, 376, and 377, stored in entries 86, 88, and 90, respectively. The bucket 375 identified by entry 86 is of event type 23, which corresponds to an event named "ship assert". The bucket number 377 defined by entry 90 is also a "ship assert". The bucket 376 defined by entry 88 is of event type 24, which corresponds to a "alert".

As shown in FIG. 5, the parameter value table 64 defines the values for each of the parameters in the buckets numbered 375, 376, and 377. In particular, the entries 92 and 94 in the parameter value table 64 identify the parameter values for the bucket 375. The entries 96 and 98 in the parameter value table 64 identify the values for the bucket 376. The entries 100, 102, and 104 in the parameter value table 64 identify the parameter values for the bucket 377. As defined in the event type table 60, the bucket 375 includes two parameters, the bucket 376 includes two parameters, and the bucket 377 includes three parameters.

The parameter name table 66 is also populated to provide a name for each of the parameters for events identified in the event type table 60. In particular, the parameters for the "ship assert" event type are named "tag" and "version." The parameters for the "alert id" event type are entitled "alert id", "last assert", and "hresult." By using the parameter name table 66, human-readable names may be assigned to each of the parameters and displayed to a user.

Figure 6A:
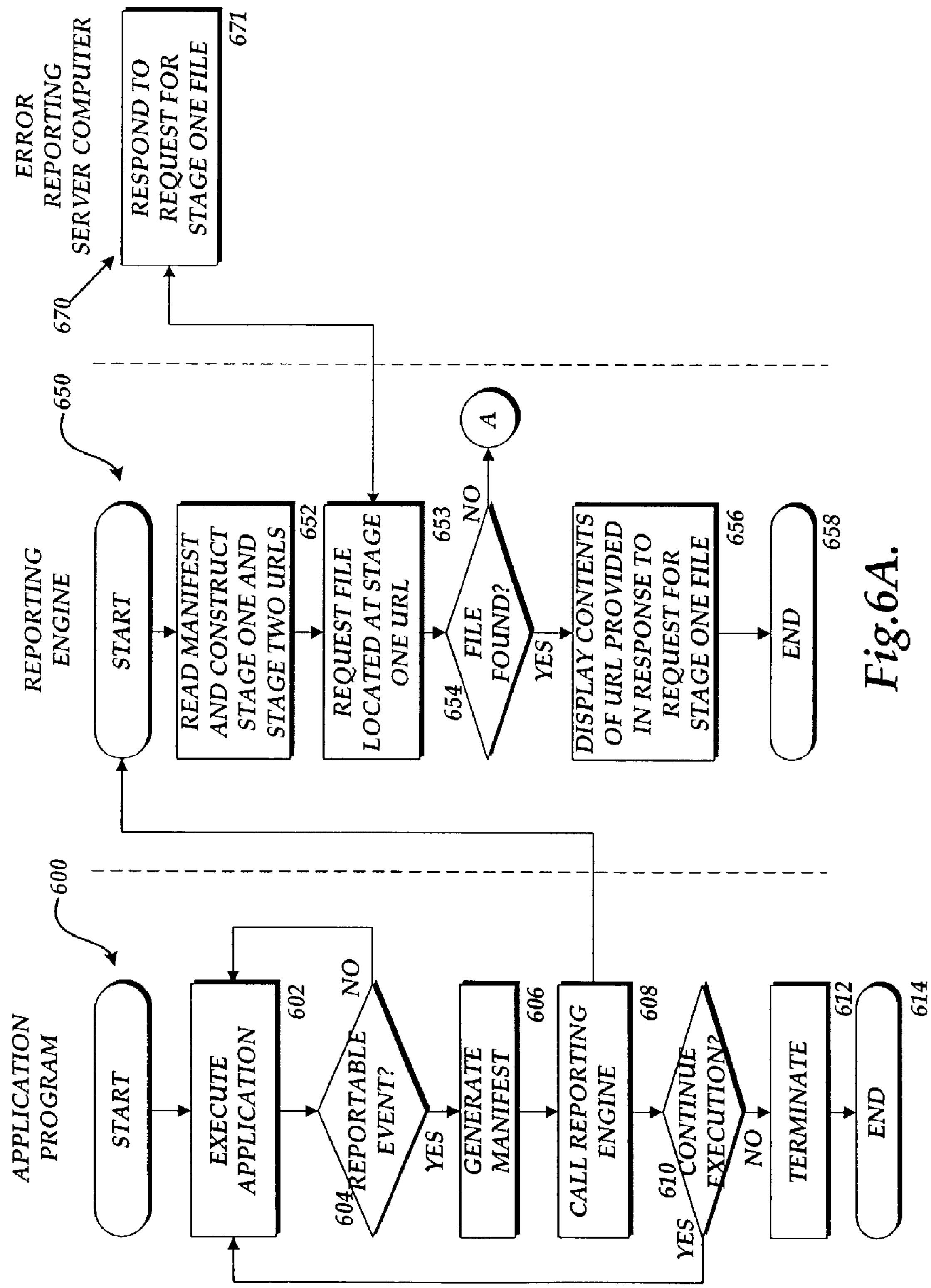
FIGS. 6A–6C are flow diagrams illustrating the operation of an application program, a reporting engine, and an error reporting server computer according to one embodiment of the present invention.
Figure 6B:
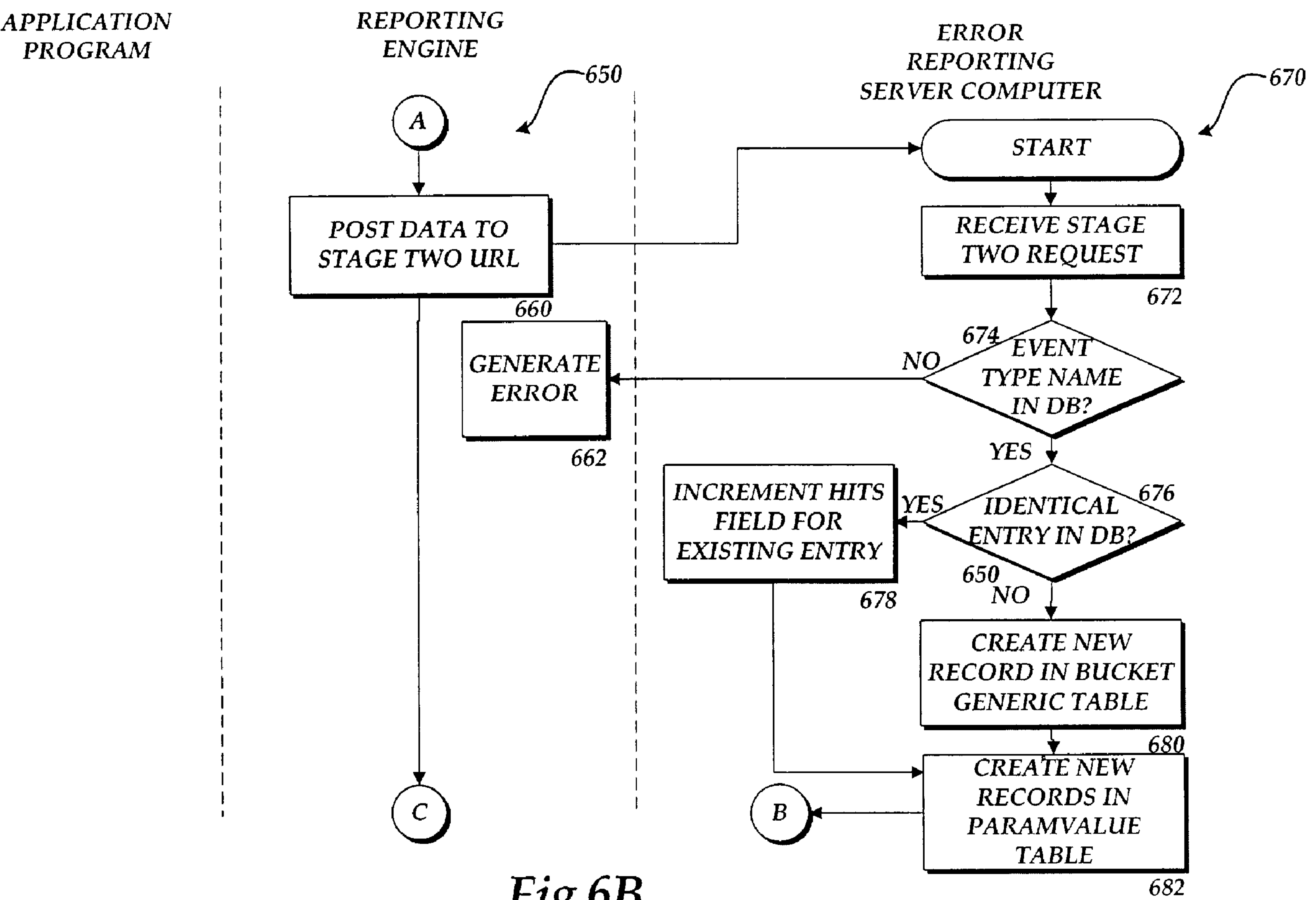
Figure 6C:
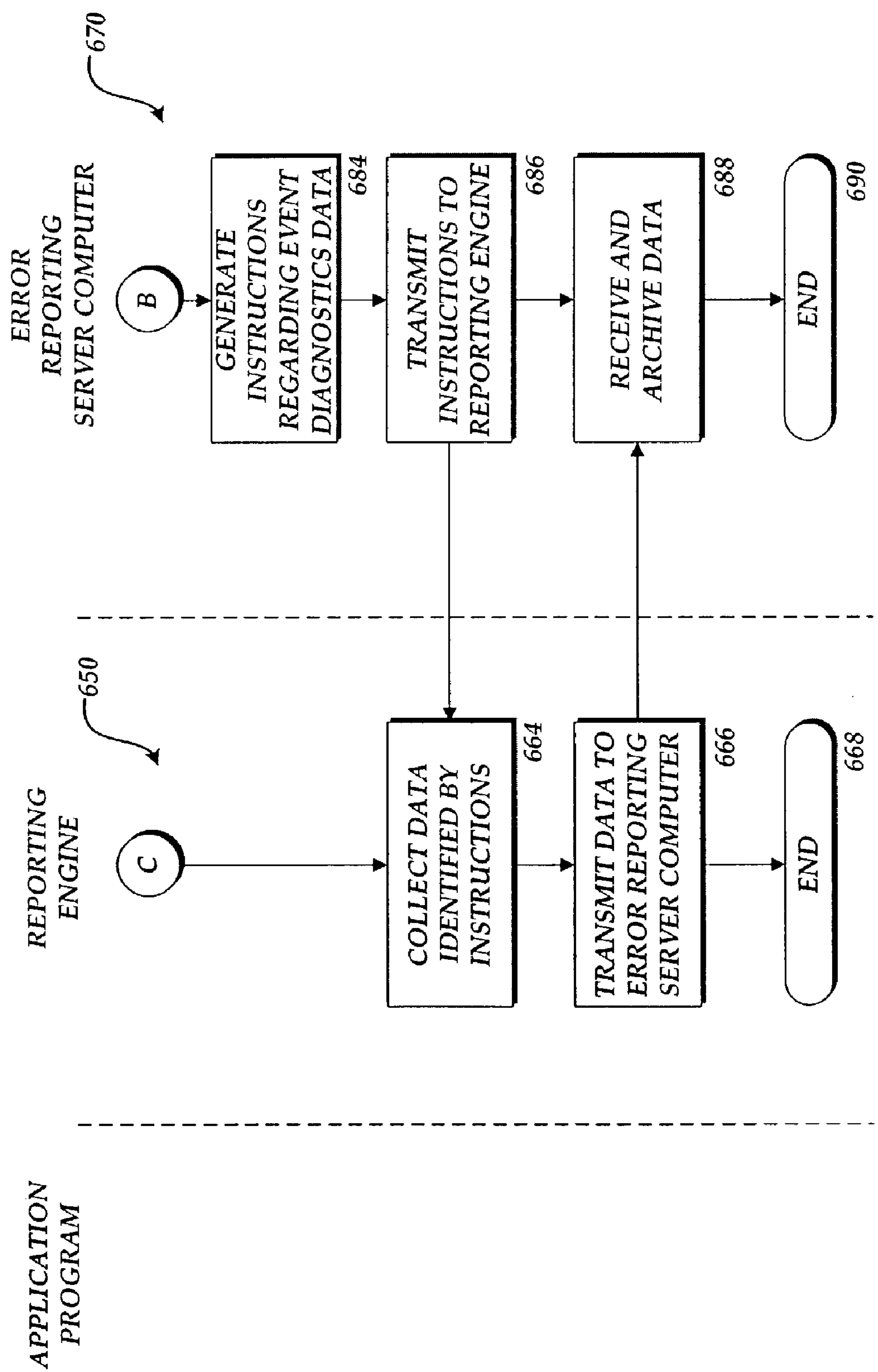

Referring now to FIGS. 6A–6C, several routines illustrating the operation of the application program 30, the reporting engine 24, and the error reporting server computer 10 will be described. In particular, the routine 600 illustrates aspects of the operation of the application program 30 executing on the client computer 2. The routine 650 illustrates various aspects of the execution of the reporting engine 24 also executing on the client computer 2. The routine 670 illustrates various aspects regarding the operation of the error reporting server computer 10. The routines 600, 650, and 670 are described together to illustrate the interaction between the client computer 2 and the error reporting server computer 10.

The routine 600 begins operation at block 602, where the application program 30 is executed. Although embodiments of the invention describe detecting the occurrence of events within an application program 30, it should be appreciated that events may also be detected and reported by an operating system 16 or other types of program modules. From block 602, the routine 600 continues to block 604, where a determination is made as to whether a reportable event has been detected. As described briefly above, a reportable event may comprise the occurrence of an unhandled exception, a program error, an assert, or the generation of a program alert. Alternatively, other types of events occurring within the application program 30 or the client computer 2 may also be reported. If a reportable event has not been detected at block 604, the routine 600 returns to block 602 where the application program 30 continues executing.

If, at block 604, it is determined that a reportable event has occurred, the routine 600 continues to block 606. At block 606, a manifest 28 is generated by the application program. As described above, the manifest comprises a text file identifying the event and including the values for one or more predefined parameters that describe the event and how it should be handled by the reporting engine.

From block 606, the routine 600 continues to block 608 where the application program 30 calls the reporting engine 24. As a part of the program call, the application program 30 provides the manifest 28 to the reporting engine 24. It should be appreciated that although the manifest 28 is described herein as a text file, the manifest 28 may take other forms in other embodiments of the invention. In particular, the information contained in the manifest 28 may be stored in a memory location shared between the application program 30 and the reporting engine 24. In this embodiment, the application program 30 may pass a pointer to the shared memory location to the reporting engine 24 with the program call.

From block 608, the routine 600 continues to block 610 where a determination is made as to whether the application program 30 should continue execution following the occurrence of the event. If the application program should continue execution, the routine 600 branches back to block 602. If the execution of the program 30 should not continue, the routine 600 continues to block 612, where it terminates. The routine 600 then ends at block 614.

At block 652, the reporting engine 24 receives the manifest 28 from the application program 30. The reporting engine 24 reads the manifest and constructs the stage one and stage two network addresses as described above. The reporting engine also sanitizes and normalizes the event type and parameter values passed by the manifest to make sure that the text can be sent clearly over the internet. For instance, the ampersand character may be removed from the event type and parameter values. As discussed above, the stage one network address comprises a uniform resource locator ("URL") for identifying a file contained on the reporting server computer 10 identifying helpful information regarding the error. The stage two network address comprises a URL pointing to the generic stage two file 48 and having the event name and parameters as query string arguments. As also discussed above, the stage one and stage two network addresses are constructed utilizing the event name and the parameters associated with the event.

From block 652, the routine 650 continues to block 653 where the reporting engine 24 requests a stage one file 46 from the error reporting server computer 10. As discussed above, the stage one URL constructed by the reporting engine 24 is utilized to request the file. At block 671, the error reporting server computer 10 responds to the request. If a file was found at the requested network location, the error reporting server computer 10 will transmit the requested stage one file 46 to the reporting engine 24. If no file was located by the error reporting server computer 10 at the requested location, the error reporting server computer 10 will respond to the request with an error message.

From block 653, the routine 650 continues to block 654 where the reporting engine 24 determines whether a stage one file was located on the error reporting server computer 10. If a stage one file was located, the reporting engine 24 utilizes the network address contained in the stage one file to locate helpful information regarding the event. As described above, the reporting engine 24 may cause a Web browser application to launch directed to a support Web site 40, knowledgebase articles 42, or other support information 44 provided by the information server 5. From block 656, the routine 650 continues to block 658, where it ends.

If, at block 654, the reporting engine 24 determines that the error reporting server computer 10 did not return a stage one file, the routine 650 branches to block 660. At block 660, the reporting engine 24 transmits to the error reporting server computer 10 the event name and parameter values relating to the event. The stage two request is received by the error reporting server computer 10 at block 672.

The routine 670 then continues from block 672 to block 674 where the error reporting server computer 10 determines whether the event type name received as part of the stage two post is contained in the generic event reporting database 56. If the event type name is not in the database, the error reporting server computer 10 responds to the reporting engine 24 with an error at block 662. If the event name is in the database, the routine 670 continues from block 674 to block 676.

At block 676, the stage two file 48 determines whether an existing entry in the generic event reporting database 56 exists that corresponds to the data posted by the reporting engine 24. If an existing entry exists in the database, the routine 670 branches to block 678 where the hits field 70H is incremented for the existing entry. The routine 670 then continues from block 678 to block 682.

If, at block 676, it is determined that an identical entry does not exist in the generic event reporting database 56, the routine 670 continues to block 680. At block 680, the stage two file 48 creates a new record in the bucket table 62 corresponding to the data provided by the reporting engine 24. The routine 670 then continues to block 682 where new records are created in the parameter value table 64 corresponding to each of the parameters provided by the reporting engine 24. From block 682, the routine 600 continues to block 684 where the data wanted field 701 of the bucket table 62 is utilized to identify additional data needed from the client computer 2 regarding the occurrence of the event. These instructions are then transmitted from the error reporting server computer 10 to the reporting engine 24 at block 686.

At block 664, the reporting engine 24 receives the request for additional data and collects the data identified by the instructions. This may include collecting the contents of memory, registers, or other data. The routine 650 then continues to block 666, where the additional data is transmitted from the reporting engine 24 to the error reporting server computer 10. The error reporting server computer 10 receives the data and stores the data as archived event diagnostic data 58. The routines 650 and 670 then end at blocks 668 and 690, respectively.

It should be appreciated that the functions described herein as being performed separately by the information server 5, the error reporting server computer 10 and the database server computer 9 may be performed by a single computing system or by another combination of separate computing systems. Moreover, it may be appreciated that the reporting engine 24 or the application 30 may collect additional data needed regarding the occurrence of an event at the time the event occurs. This information then may be stored by the reporting engine 24 or the application 30 until a determination can be made as to whether the error reporting server computer 10 wants the information.

Based on the foregoing, it should be appreciated that the present invention provides a method, computer-readable medium, database, and apparatus for generically reporting the occurrence of events within a computer system. While the invention has been particularly shown and described with reference to several embodiments thereof, it will be understood by those skilled in the art that various other changes in the form and details may be made therein without departing from the spirit and scope of the invention.

Although the invention has been described in language specific to computer structural features, methodological acts and computer readable media, it is to be understood that the invention defined in the appended claims is not necessarily limited to the specific structures, acts or media described. Therefore, the specific structural features, acts and mediums are disclosed as exemplary embodiments implementing the claimed invention.

We claim:

1. A method for reporting the occurrence of an event comprising:

detecting the occurrence of the event;

in response to detecting the occurrence of the event, identifying parameter values corresponding to one or more predefined parameters that describe the event; and storing the parameter values in a normalized database configured for storing event parameters corresponding to the occurrence of a plurality of types of events, wherein the normalized database comprises, a first table storing data defining an event type for an event and data identifying the number of parameters utilized to describe an occurrence of the event, a second table related to the first table storing data uniquely identifying one or more occurrences of the event and data identifying the event type for each occurrence, a third table related to the second table storing parameter values for each occurrence of an event, the number of parameter values eguivalent to the number of parameters identified in the first table for the event type corresponding to the occurrence of the event, and a fourth table related to the first table, the fourth table storing data identifying a name for each of the parameters associated with each event type.

2. The method of claim 1, wherein the event comprises an unhandled exception, a program crash, or an assert.

3. The method of claim 1, wherein the second table further comprises data identifying a number of occurrences in the database for each event type and unique parameter values corresponding to an occurrence of the event.

4. A computer-readable storage medium comprising computer-readable instruction which, when executed by a computer, cause the computer to perform the method of claim 1.

5. A computer-controlled apparatus capable of performing the method of claim 1.

6. A method of generically reporting the occurrence of a plurality of types of events, comprising:

detecting the occurrence of an event;

in response to detecting the occurrence of the event, generating an event manifest containing data identifying an event name for the event and containing parameter values for one or more parameters corresponding to the event name;

transmitting the event name and parameter values to a remote database server application;

in response to transmitting the event name and parameter values, receiving data identifying additional data needed regarding the occurrence of the event;

assembling the needed data;

transmitting the needed data to the remote database server; and in response to detecting the occurrence of the event and following the generation of the manifest:

constructing a network address comprising the event name and the parameters, attempting to locate a data file at the network address, determining whether the data file was located at the network address and retrieving the data file, in response to retrieving the data file. identifying a second network address based on the contents of the data file, and retrieving information regarding the occurrence of the event from the second network location.

7. The method of claim 6, wherein the event comprises a program crash, a setup error, or an assert.

8. The method of claim 6, further comprising:

receiving the event name and parameter values;

determining whether the event name is identified in a first database table containing data associating an event type and a number of parameters with the event name;

in response to determining that the event name is identified in the first table, creating a new record in a second database table, the new record uniquely identifying the occurrence of the event and the event type for the occurrence of the event; and creating one or more records in a third database table, each of the new records in the third database table identifying the occurrence of the event, a parameter associated with the occurrence of the event, and a value for the parameter.

9. The method of claim 8, further comprising:

identifying the needed data from a record stored in the second database table corresponding to the event type.

10. The method of claim 9, further comprising:

storing the needed data in a database record associated with the event type.

11. The method of claim 10, further comprising:

receiving the event name and parameter values;

determining whether the event name is identified in a first database table containing data associating an event type and a number of parameters with the event name;

in response to determining that the event name is identified in the first table, determining whether an occurrence of the event is identified in an existing database record having an event name and parameter values identical to the received event name and parameter values; and incrementing a hit value associated with the existing value in response to locating a matching existing database record.

12. A computer-readable storage medium comprising computer-readable instructions which, when executed by a computer, cause the computer to perform the method of claim 6.

13. A computer-controlled apparatus capable of performing the method of claim 6.

14. A database for storing data relating to one or more events, comprising:

a first table storing data defining an event type for an event and data identifying the number of parameters utilized to describe an occurrence of the event;

a second table related to the first table storing data uniquely identifying one or more occurrences of the event and data identifying the event type for each occurrence;

a third table related to the second table storing parameter values for each occurrence of an event, the number of parameter values equivalent to the number of parameters identified in the first table for the event type corresponding to the occurrence of the event; and a fourth table related to the first table, the fourth table storing data identifying a name for each of the parameters associated with each event type.

15. The database of claim 14, wherein the second table further comprises data identifying a number of occurrences in the database for each event type and unique parameter values corresponding to an occurrence of the event.

16. The database of claim 15, wherein the second table further comprises data describing needed data to be provided relating to an occurrence of an event.

17. The database of claim 16, wherein the first table further comprises data identifying a name for each event type.

18. A computer-readable storage medium having stored thereon the database of claim 14.

* * * * *

UNITED STATES PATENT AND TRADEMARK OFFICE

CERTIFICATE OF CORRECTION

PATENT NO. : 7,062,681 B2
APPLICATION NO. : 10/308538
DATED : June 13, 2006
INVENTOR(S) : Larsson et al.

It is certified that error appears in the above-identified patent and that said Letters Patent is hereby corrected as shown below:

On the title page, Item (56), under "Other Publications", in column 2, line 8, delete "Detecton" and insert -- Detection --, therefor.

On page 2, Item (56), under "Other Publications", in column 1, lines 1–5, delete "Murthy, S., "How To Collect More Reliable Defect Reports," Nineteenth Annual Pacific Northwest Software Quality Conference, Oct. 2001, p. 279-293. Morin, R., "Distributed Quality Assurance," UNIX Review, Sep. 1993, vol. 11, No. 9, p. 107-108." and insert -- Murthy, S., "How To Collect More Reliable Defect Reports," Nineteenth Annual Pacific Northwest Software Quality Conference, Oct. 2001, p. 279-293.
Morin, R., "Distributed Quality Assurance," UNIX Review, Sep. 1993, vol. 11, No. 9, p. 107-108. --, therefor.

In column 7, line 3, delete "en-or" and insert -- error --, therefor.

In column 7, line 21, delete "myd11" and insert -- mydll --, therefor.

In column 9, line 57, after "field" delete "701" and insert -- 70I --, therefor.

In column 12, line 58, after "field" delete "701" and insert -- 70I --, therefor.

In column 13, line 57, in Claim 1, delete "eguivalent" and insert -- equivalent --, therefor.

In column 14, line 23, in Claim 6, after "server" insert -- application; --.

In column 14, line 31, in Claim 6, after "file" delete "." and insert -- , --, therefor.

Signed and Sealed this

Thirteenth Day of April, 2010

David J. Kappos

David J. Kappos
*Director of the United States Patent and Trademark Office*